J. PARSONS, Jr.
Cultivator.
No. 2,879.
Patented Dec. 12, 1842.
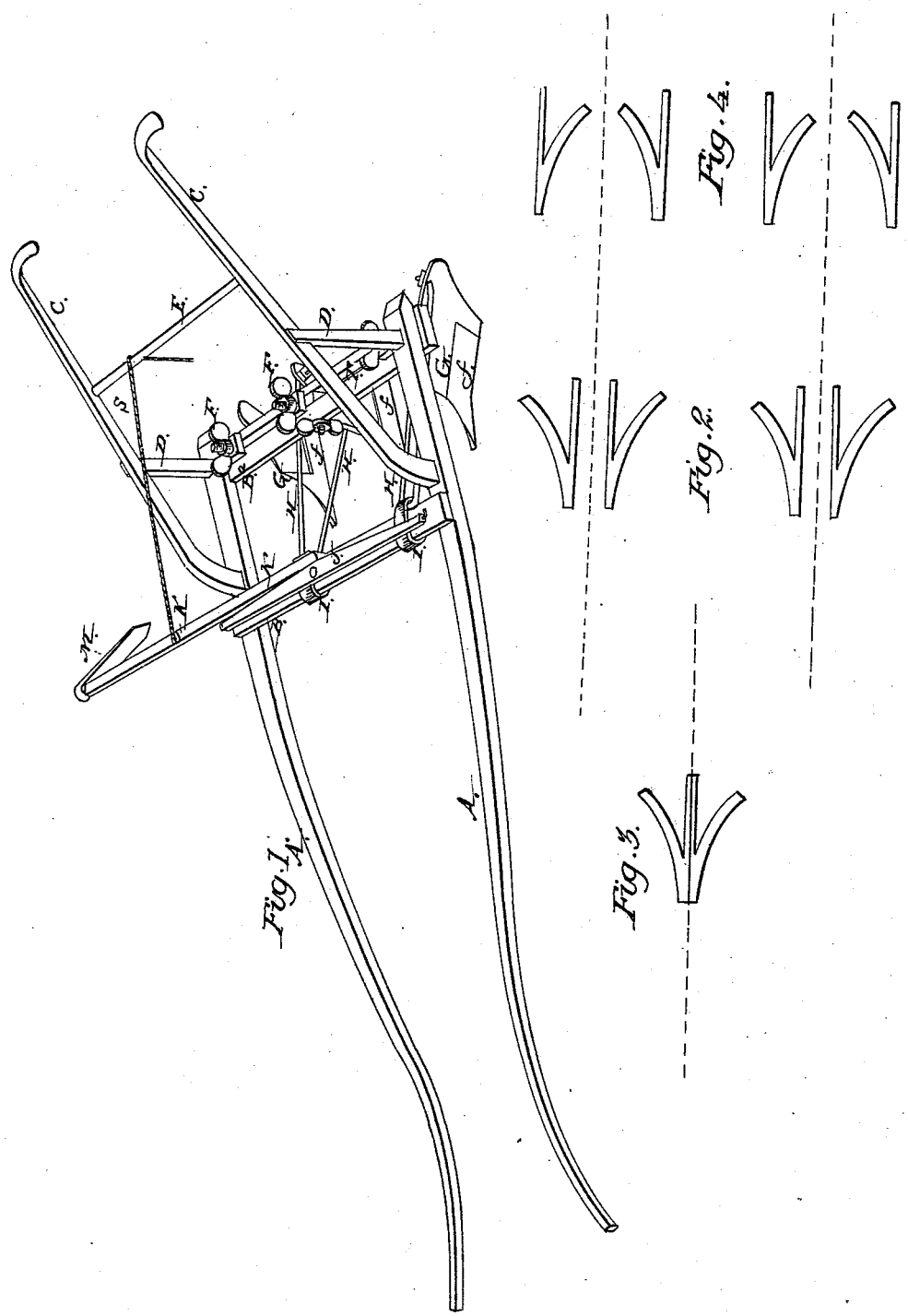

UNITED STATES PATENT OFFICE.

JAMES PARSONS, JR., OF DUBLIN, INDIANA.

IMPROVEMENT IN COMBINED PLOWS.

Specification forming part of Letters Patent No. 2,879, dated December 12, 1842.

*To all whom it may concern:*

Be it known that I, JAMES PARSONS, Jr., of the town of Dublin, in the county of Wayne and State of Indiana, have invented a new and useful combined plow for cultivating corn, cotton, potatoes, tobacco, and other vegetables requiring the earth to be thrown toward or from the rows, or into several furrows between them at one operation by the same implement, which can be converted into the several forms and shapes required to perform the several kinds of plowing, called "Parson's Universal Plow and Cultivator," which is described as follows, reference being had to the annexed drawings of the same, making part of this specification.

Figure 1 is a perspective view of the implement in a position for plowing the furrows and the marker arranged for marking the distance of the next parallel rows. Fig. 2 represents a ground plan of four plows for throwing the earth from the rows. Fig. 3 represents a right and left plow brought close together to form a cultivator. Fig. 4 represents a ground plan of four plows arranged for throwing the earth toward two rows, the horse walking between them.

This cultivator has the peculiar principle of being metamorphosed into many shapes to suit the various crops in all their different stages from the furrowing out ground previous to planting until it is no longer necessary to work among them.

A A represent the shafts for the horse to walk between; B B, two cross-pieces bolted onto shafts, the rear one being slotted to admit the standards of the plow, the slot lettered I extending nearly from one end to the other of the cross-piece $B^2$; C C, two handles supported by two standards, D D; E, rod between the handles, connecting them together; F F, two sheths or standards with tenons passing through the slot T in the hind cross-piece, $B^2$, and keyed, screwed, or otherwise secured on top; G G, mold-boards fastened to sheths or standards with bolts or otherwise; $f f$, shares or points fastened to mold-boards with bolts or locks; H H, rods or braces connecting the mold-boards with loops or clips I I. The loops or clips I I are to slide upon the forward cross-piece B and fastened with keys adjustable at pleasure, and are shaped to correspond with the cross-piece B, either oval, round, or square; J, single-tree, to which the horse is attached; K, gage or marking-rod, hung to forward cross-piece by swivel, for marking the width of the rows, which can be thrown on either side alternately by a cord, S, running back to the supporting-rod E, between the handles M. The marker is to gage the distance which the plow is to run from the last furrow in laying off ground previous to planting.

The sheths or standards by driving out the keys or unscrewing the nuts and unhooking the braces at I I can be drawn out and transferred into various positions in the slot, slit, or mortise in the hind cross-piece in order to throw the furrow to the right or left, and also to place the points of two shares together, forming a double mold-board and share for throwing the furrow both ways from the ridge forward between two rows. The brace-rods H are curved at each end in the form of hooks, so as to hook into apertures in the plows and into or through the clips I.

The plows may be made in the usual or most approved manner, of convenient size and suitable material for the purposes intended. Likewise the shafts and handles may be made in the usual manner.

What I claim as my invention, and which I desire to secure by Letters Patent, is—

The construction of the slotted cross-piece and hook-braces and sliding clips with the forward connecting cross-piece of the shafts, rendering the aforesaid combined plow convertible into agricultural implements of various descriptions for various purposes, as before described.

JAMES PARSONS, JR.

Witnesses:
REUBEN REYNOLDS,
ROBERT E. SCHOOLFIELD.